(12) United States Patent
Baqai et al.

(10) Patent No.: US 9,525,804 B2
(45) Date of Patent: Dec. 20, 2016

(54) MULTI-BAND YCBCR NOISE MODELING AND NOISE REDUCTION BASED ON SCENE METADATA

(71) Applicant: Apple Inc., Cupertino, CA (US)

(72) Inventors: Farhan A. Baqai, Fremont, CA (US);
Claus Molgaard, Los Altos, CA (US);
Fabio Riccardi, Palo Alto, CA (US);
Russell Pflughaupt, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/474,100

(22) Filed: Aug. 30, 2014

(65) Prior Publication Data

US 2016/0065794 A1  Mar. 3, 2016

(51) Int. Cl.
| | |
|---|---|
| H04N 9/077 | (2006.01) |
| H04N 5/217 | (2011.01) |
| G06T 5/00 | (2006.01) |
| H04N 9/64 | (2006.01) |
| G06T 5/10 | (2006.01) |
| H04N 5/21 | (2006.01) |

(52) U.S. Cl.
CPC ............... *H04N 5/217* (2013.01); *G06T 5/002* (2013.01); *G06T 5/10* (2013.01); *H04N 5/21* (2013.01); *H04N 9/077* (2013.01); *H04N 9/646* (2013.01); *G06T 2207/10024* (2013.01); *G06T 2207/20016* (2013.01); *G06T 2207/20048* (2013.01)

(58) Field of Classification Search
CPC .......... G06T 5/001–5/004; G06T 2207/20182; G06T 2207/20192; G06T 5/10; H04N 5/217; H04N 9/045; H04N 9/77; H04N 7/646; H04N 9/077

USPC ....... 348/182, 241, 242, 243, 444, 450, 453, 348/587, 592, 609, 631, 663, 666, 252, 348/24; 382/260, 261, 264, 266, 269, 254, 382/274, 275; 358/3.26, 3.27, 463
See application file for complete search history.

(56) References Cited

U.S. PATENT DOCUMENTS

| | | | |
|---|---|---|---|
| 5,130,798 A | 7/1992 | Christopher | |
| 6,018,596 A * | 1/2000 | Wilkinson | H04N 5/142 348/E5.064 |

(Continued)

OTHER PUBLICATIONS

A. Buades, B. Coll, and J.-M. Morel, "A non-local algorithm for image denoising," in Proceedings of IEEE Conference on Computer Vision and Pattern Recognition, vol. 2, 2005, pp. 60-65.

(Continued)

*Primary Examiner* — Tuan Ho
*Assistant Examiner* — Marly Camargo
(74) *Attorney, Agent, or Firm* — Blank Rome LLP

(57) ABSTRACT

Image enhancement is achieved by separating image signals, e.g. YCbCr image signals, into a series of frequency bands and performing noise reduction on bands below a given frequency but not on bands above that frequency. The bands are summed to develop the image enhanced signals. The YCbCr, multi-band approach to denoising is able to operate independently—and in an optimized fashion—on both luma and chroma channels. Noise reduction is done based on models developed for both luma and chroma channels by measurements taken for multiple frequency bands, in multiple patches on the ColorChecker chart, and at multiple gain levels, in order to develop a simple yet robust set of models that may be tuned off-line a single time for each camera and then applied to images taken by such cameras in real-time without excessive processing requirements and with satisfactory results across illuminant types and lighting conditions.

20 Claims, 7 Drawing Sheets

(56) References Cited

U.S. PATENT DOCUMENTS

| | | | |
|---|---|---|---|
| 6,804,408 B1* | 10/2004 | Gallagher | H04N 1/58 |
| | | | 382/272 |
| 7,426,314 B2* | 9/2008 | Kimbell | G06K 9/40 |
| | | | 382/54 |
| 7,432,986 B2 | 10/2008 | Winger | |
| 7,437,013 B2 | 10/2008 | Anderson | |
| 7,515,160 B2 | 4/2009 | Kerofsky | |
| 7,590,303 B2 | 9/2009 | Lee | |
| 7,969,511 B2 | 6/2011 | Kim | |
| 8,108,211 B2 | 1/2012 | Baqai | |
| 8,194,160 B2* | 6/2012 | Tsuruoka | G06T 5/009 |
| | | | 348/222.1 |
| 8,264,574 B2 | 9/2012 | Grosvenor | |
| 8,411,938 B2 | 4/2013 | Zhang | |
| 8,571,347 B2 | 10/2013 | Srinivasan | |
| 8,614,746 B2 | 12/2013 | Choe | |
| 8,711,248 B2 | 4/2014 | Jandhyala | |
| 8,711,249 B2 | 4/2014 | Baqai | |
| 8,743,208 B2 | 6/2014 | Ovsiannikov | |
| 8,768,054 B2 | 7/2014 | Aragaki | |
| 8,989,516 B2 | 3/2015 | Albu | |
| 9,299,130 B2 | 3/2016 | Panetta | |
| 2002/0196907 A1* | 12/2002 | Shinbata | G06T 5/10 |
| | | | 378/210 |
| 2006/0023965 A1 | 2/2006 | Kimbell | |
| 2006/0088275 A1 | 4/2006 | Odea | |
| 2006/0274210 A1* | 12/2006 | Kim | H04N 9/646 |
| | | | 348/624 |
| 2007/0146236 A1 | 6/2007 | Kerofsky | |
| 2007/0258657 A1* | 11/2007 | Kryda | G06T 5/20 |
| | | | 382/261 |
| 2008/0199100 A1* | 8/2008 | Ishiga | G06T 5/10 |
| | | | 382/263 |
| 2009/0129695 A1 | 5/2009 | Aldrich | |
| 2009/0136057 A1 | 5/2009 | Taenzer | |
| 2009/0322912 A1 | 12/2009 | Blanquart | |
| 2011/0075935 A1 | 3/2011 | Baqai | |
| 2012/0019690 A1 | 1/2012 | Stirling-Gallacher | |
| 2012/0207396 A1 | 8/2012 | Dong | |
| 2012/0301046 A1* | 11/2012 | Wallace | G06T 5/003 |
| | | | 382/263 |
| 2012/0307110 A1 | 12/2012 | Baqai | |
| 2013/0329004 A1* | 12/2013 | Baqai | H04N 5/217 |
| | | | 348/36 |
| 2014/0044375 A1 | 2/2014 | Xu | |

OTHER PUBLICATIONS

C. Liu, W. T. Freeman, R. Szeliski, and S. B. Kang, "Noise estimation from a single image," in Proceedings of IEEE Conference on Computer Vision and Pattern Recognition, vol. 1, 2006, pp. 901-908.

S. J. Julier, "The scaled unscented transformation," in Proceedings of American Control Conference, vol. 6, 2002, pp. 4555-4559.

X. Liu, M. Tanaka, and M. Okutomi, "Estimation of signal dependent noise parameters from a single image," in Proceedings of IEEE International Conference on Image Processing, 2013, pp. 79-82.

X. Liu, M. Tanaka, and M. Okutomi, "Noise level estimation using weak textured patches of a single noisy image," in Proceedings of IEEE International Conference on Image Processing, 2012, pp. 665-668.

* cited by examiner

MULTI-BAND YCBCR NOISE MODELING AND NOISE REDUCTION BASED ON SCENE METADATA

CROSS-REFERENCE TO RELATED APPLICATIONS

This application is related to commonly-assigned U.S. patent application Ser. No. 13/492,302 entitled "Method of and Apparatus for Image Enhancement," filed Jun. 8, 2012, which is hereby incorporated by reference in its entirety.

BACKGROUND OF THE INVENTION

Field of the Invention

The invention is related to image processing of captured images. More particularly, it is related to multi-band denoising of images.

Description of the Related Art

The image signal processor (ISP) takes the raw image from the image sensor, and then optionally performs one or more of several operations, such as: gain, binning (in low-light), noise reduction, local tone mapping, demosaicing, white balancing, gamma, filtering, and color enhancement. The ISP provides a YCbCr (i.e., luma-chroma) image, which is later compressed. In most cases, post-ISP operations are performed in YCbCr space, not in RGB (i.e., red-green-blue) space. There are several challenges associated with obtaining an accurate YCbCr noise model. First, the noise characteristics of images obtained by a digital camera are quite complicated. They may have signal dependence, e.g., due to shot noise in the image sensor and gamma operations in the camera pipeline, frequency dependence caused by demosaicing, luma sharpening, chroma band-limiting, and binning, inter-channel correlation resulting from demosaicing and color correction, and channel dependence caused by white balancing. In short, the noise may have signal-wise, channel-wise, and band-wise dependencies.

The noise reduction pipeline in a typical consumer digital camera, e.g., a mobile phone camera, is fairly basic. It is constrained by the number of delay lines available for the image signal processor, as well as computational limitations. Second, since it typically takes a few years to design, test, and produce an image signal processor; the noise reduction algorithm is typically a few generations old by the time a device makes it to market. The camera pipeline may introduce a number of artifacts, such as false edges, sprinkles, and black/white pixel clumps that, from a signal point-of-view, are not noise, but actually appear more like structure. These artifacts severely degrade image quality in bright light, especially in the sky regions (i.e., "blue-sky noise"), but they are especially severe in low-light. One way to mitigate noise as well as artifacts is to increase exposure time so that more photons can be accumulated in the sensor, but this introduces motion blur. Another way to mitigate noise is to use a sensor that has larger well capacity, such as four-thirds, APS-C, or full frame. These sensors are used in DSLR cameras and are quite expensive. Also, they are physically larger, requiring more space and making them infeasible for the thin form factors of most modern-day mobile phone cameras.

An accurate noise estimate is important when a measure of local similarity is desired. For instance, in denoising, pixels that are similar in value to the pixel currently being denoised are typically averaged together in some fashion. Performance in such denoising operations is directly dependent on the quality of the "similar pixel" set, which in turn is dependent on the "similarity measure." Robust similarity measures may, therefore, preferably rely on an effective and accurate noise model in order to be able to adapt to imaging conditions. If the noise model is accurate, the similarity measure can help to differentiate between signal and noise. Similarly, in applications where multiple frames are fused (e.g., high dynamic range imaging) or stitching is involved (e.g., panoramic imaging), there may be a need to differentiate between still and moving objects within the images, as well as compensate for registration errors. Relative motion between frames can result from three main factors: 1) object motion; 2) camera shake; and 3) rolling shutter. An accurate noise model, such as that described herein, may help to differentiate between signal and motion for various imaging conditions, moving objects, and hand shake. If the similarity measure is based on an accurate noise model, it will be able to adapt to changing conditions, object motion, and jitter—resulting in fewer "ghosting" artifacts in the image and better overall image quality in a wide variety of imaging conditions.

SUMMARY OF THE INVENTION

Embodiments according to the present invention provide image enhancement by separating the image signals, e.g., a YCbCr image signal, into a series of frequency bands and performing noise reduction independently on each of the bands using a noise model that is based on camera properties and scene metadata. The noise model for a particular camera may be constructed "offline" (i.e., in the laboratory or at a manufacturing facility) once for the particular camera, and may take into account various types of camera metadata, such as: analog and digital camera gains, signal-to-noise ratios, lux levels, special modes (e.g., binning), white balance gains, etc. In one embodiment, an affine linear model may be used for the luma channel, wherein the noise model depends on signal, analog and digital camera gains, a non-linear scaling function for luma that scales the full-band noise to each sub-band, and a 'system-wide' gamma estimate for the luma channel. According to some embodiments, a chroma noise model may also be applied, wherein the noise model depends on, e.g., camera gains, white balance gains, a non-linear scaling function for chroma that scales the full-band noise to each sub-band and a 'system-wide' gamma estimate for the chroma channel. Such noise models may be used to effectively characterize band-wise, signal-wise, and channel-wise YCbCr dependencies in the image signal. The end result is a computationally efficient, yet powerful, way to characterize YCbCr noise that can be used in a number of on-device—as well as off-device—applications across a broad array of camera devices.

In some embodiments, noise reduction is performed on bands below a given frequency but not on bands above that frequency. The bands are summed to develop the image enhanced signals. This results in improved sharpness and masking of image processing pipeline artifacts. In other embodiments, each band may be filtered independently once the noise model has been applied to the band.

In still other embodiments, the noise model may be spatially-dependent, e.g., taking into account lens shading gains, local tone mapping (LTM) operations, and/or fusion strength, so that it may spatially adapt to changing noise levels across different parts of the image.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Figure 1:
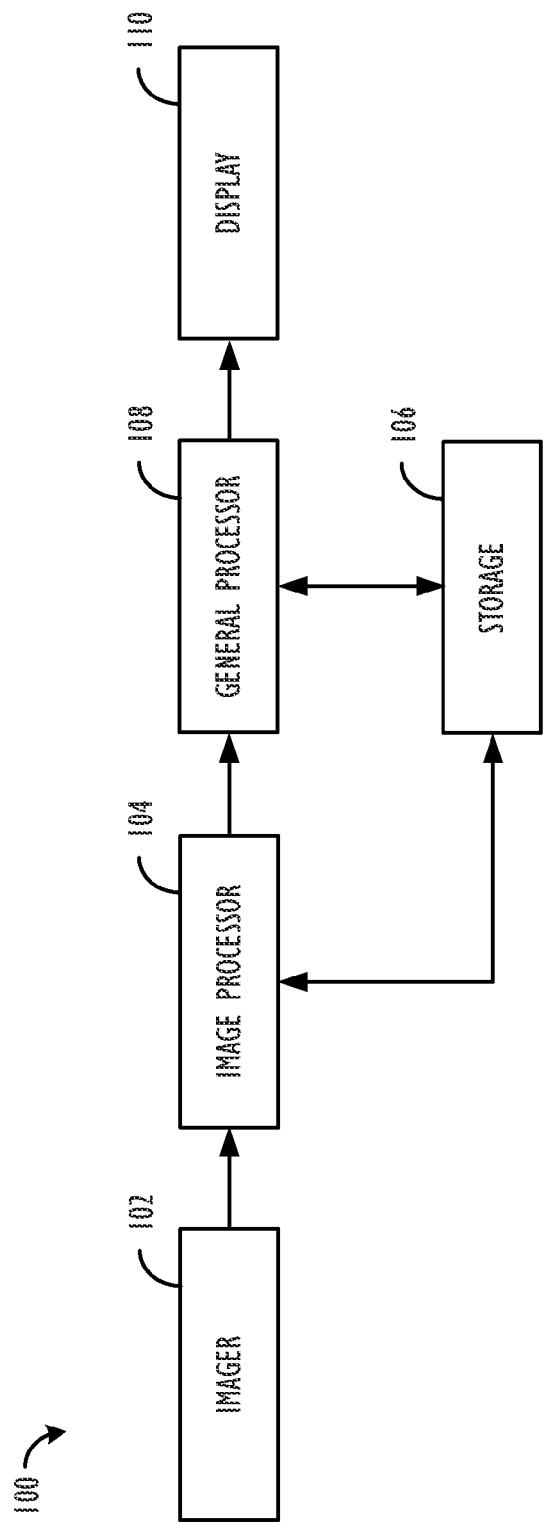
FIG. 1 is a block diagram of a device, according to one embodiment.

FIG. 1 is a block diagram of an exemplary device 100, such as a camera or phone. An imager 102, as typical in such devices, is connected to an image processor 104. The image processor 104 is connected to storage 106 for both processing storage and longer-term storage after completion of processing. The image processor 104 is also connected to a general processor 108, which performs more general duties. The general processor 108 is connected to a display 110 for providing a user the ability to view the current or previously stored images, which the general processor 108 retrieves from storage 106. Storage 106 also stores the firmware and other software used by the image processor 104 and general processor 106 that perform the preferred embodiments. This is a very general overview, and many variations can be developed, such as combining the image processor and general processor or forming the image processor using hardware, FPGAs, or programmed DSPs or some combination, as known to those skilled in the art.

Figure 2:
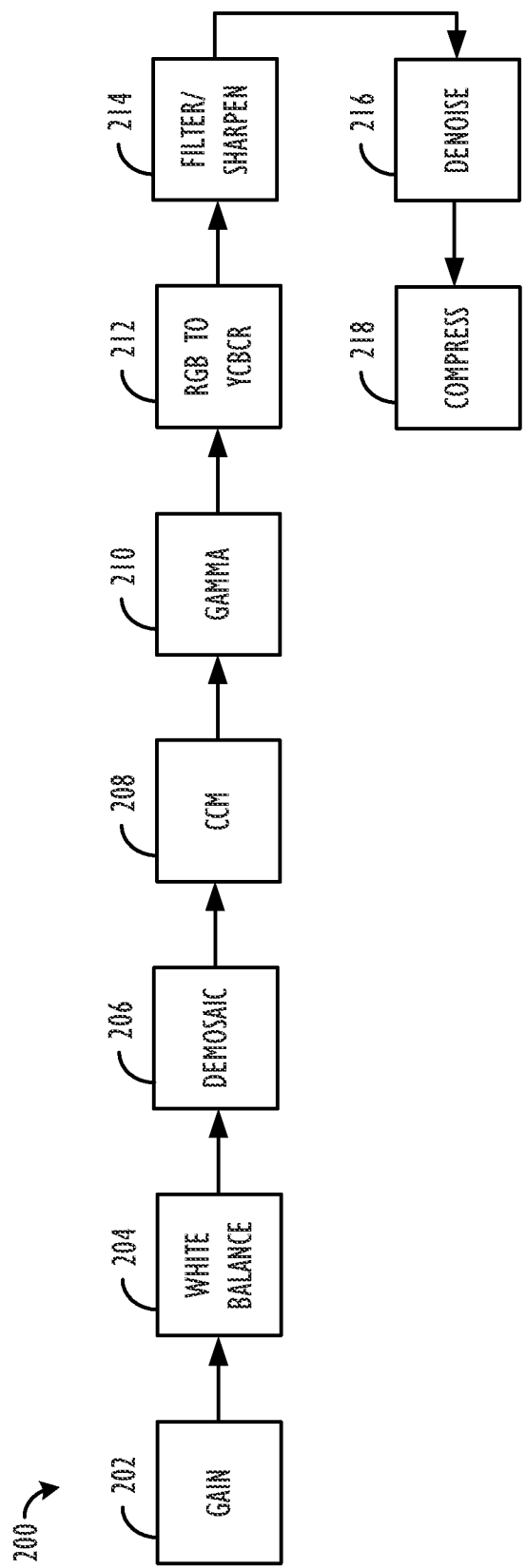
FIG. 2 is an exemplary camera-processing pipeline, according to one embodiment.

FIG. 2 shows a block diagram of an exemplary camera pipeline 200 that receives the output of the imager 102. The imager 102 sends a signal that has Gaussian, white and uncorrelated noise but has signal level dependence. The noise also may have missing pixels (e.g., if it has been mosaiced). A gain component 202 produces high gain in low-light conditions and low gain at high-light conditions. Signal-noise behavior changes accordingly. A white balance component 204 changes gains for R, G, and B channels depending on illumination and illuminant type. Furthermore, channel dependence exists after the white balance component 204. After using a demosaicing component 206 to demosaic complete RGB planes, there is frequency dependent inter-channel correlation. Specifically, G-channel high frequency noise is copied to the B and R channels, maintaining higher inter-channel correlation than at low frequency. After a color correction matrix component 208, the inter-channel correlation is more complicated. After a gamma component 210, strong level dependence is added, and the noise may no longer be assumed to be Gaussian. An RGB to YCbCr conversion 212 may be used to convert to luma and chroma signals, adding an additional inter-channel dependence, as well as channel-wise, signal-wise, and band-wise noise. In particular, in the RAW domain, the same scaling is applied to all channels, but luma and chroma values are a result of different operations in the pipeline (e.g., luma is typically sharpened, while chroma is typically band-limited). Also, white balancing and color correction operations performed in the pipeline tend to have a bigger impact on chroma data. Thus, a constant scaling factor in the RAW domain will translate to different scaling factors for luma and chroma channels. A sharpening/filtering component 214 may boost the luma signal's high frequency components and bandlimit the chroma signals, causing additional frequency dependence. Denoising according to various embodiments of the present invention may be applied by denoiser 216. Additional compression may be done in the compress unit 218.

Rather than view this problem from the prism of image denoising, embodiments according to the present invention treat it from the perspective of image enhancement. The goal is to preserve a sharp impression, avoid a plastic-like look, and remove objectionable low- and mid-frequency noise, as well as retain a certain amount of more visually-preferable, high-frequency noise (which has the added benefit of masking image processing pipeline artifacts, as well). All these effects, in general, result in a more pleasing look to the resulting denoised image.

Figure 3:
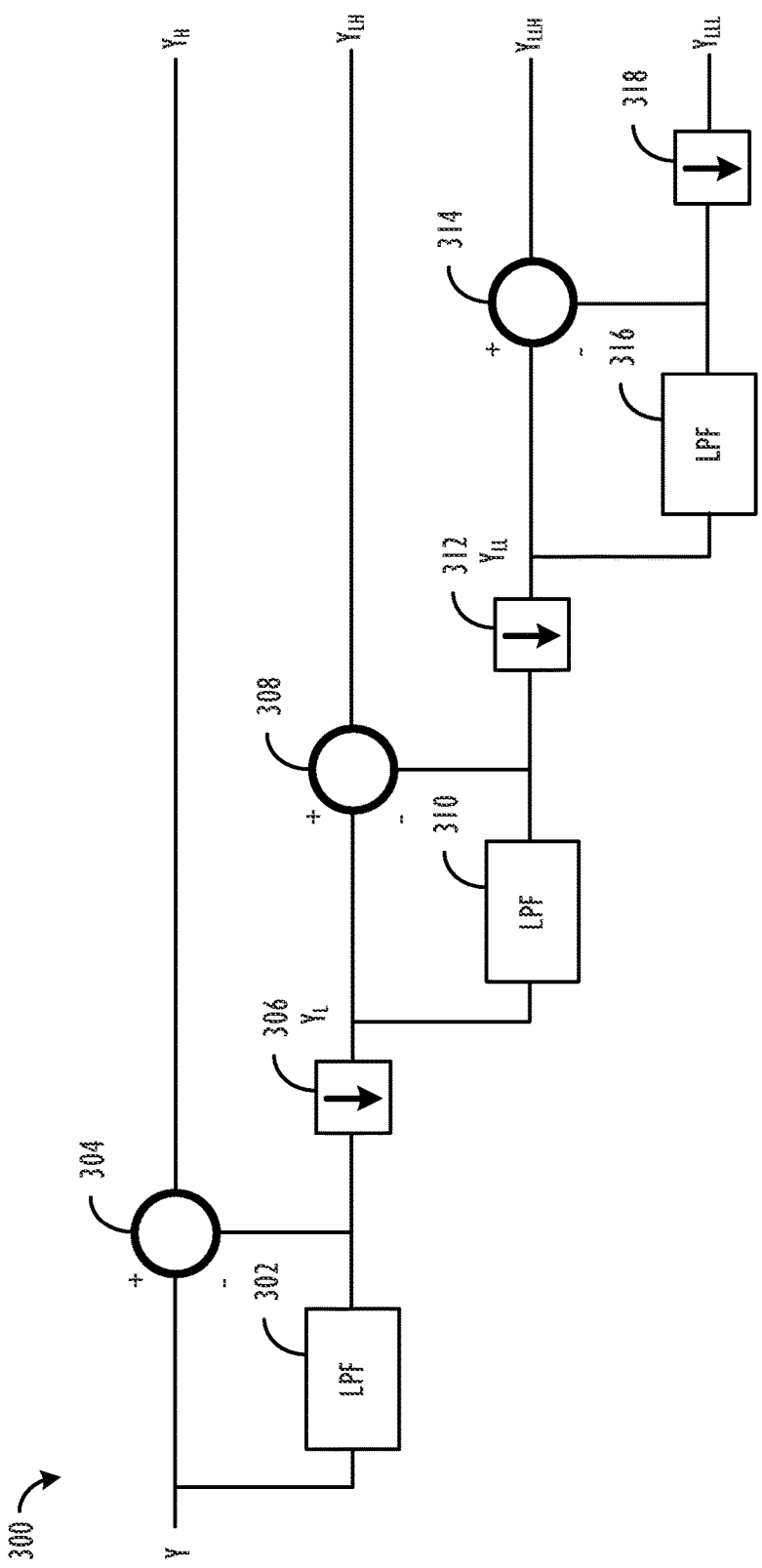
FIG. 3 is a block diagram of a multi-band decomposition filter chain, according to one embodiment.

Turning now to FIG. 3, an exemplary block diagram of a multi-band decomposition filter chain 300 is shown. As will be discussed in further detail below, decomposing an image signal into multiple bands is essential for accurately modeling the non-white nature of YCbCr noise. What this means is that, while the full-band YCbCr noise is not white, it is reasonable to assume it to be band-wise white. The number of bands depends on pipeline characteristics and desired accuracy. The incoming luma data (Y) (or chroma data, in the case of a chroma decomposition filter chain) may first be provided to a first low pass filter (LPF) 302. The incoming luma data has the output of the first low pass filter 302 subtracted by subtracting junction 304. The output of the subtracting junction 304, i.e., the highest frequency band data, is referred to herein as $Y_H$. The output of the first low pass filter 302 is provided to downsampler 306. In some embodiments, the image data may be down-sample by a factor of two in each direction. Thus, an input image that is 8 MP is size will be 2 MP in size after being downsampled once, 0.5 MP after being downsampled twice, 125 KP after being downsample a third time, and so forth. The output from downsampler 306 may be provided to a second low pass filter 310. The second low pass filter 310 has a bandwidth similar to that of the first low pass filter 302, as preferably all of the bands are equal, though different size bands could be used if desired. The output of the second low pass filter 310 is provided to the subtraction input of the subtracting junction 308, so that the output of the subtracting junction is the luma data in the second-highest frequency band, referred to herein as $Y_{LH}$. This chain continues until the final low pass filter 316 and the final subtracting junction 314. These both receive the luma data that has all but the two highest frequency bands removed. The final low pass filter 316 removes the third highest frequency band and provides its output to the final downsampler 318, so that the output is the luma data with the three highest frequency bands removed, referred to herein as $Y_{LH}$. In this manner, the multiple bands are separated using the band decomposition filter bank. Note that, similar decomposition may be achieved using high pass filters (HPFs) instead of LPFs. Also note that, in this embodiment, we have decomposed the signal into four bands. Depending on the desired quality and computational budget, less or more bands may be used.

Figure 4:
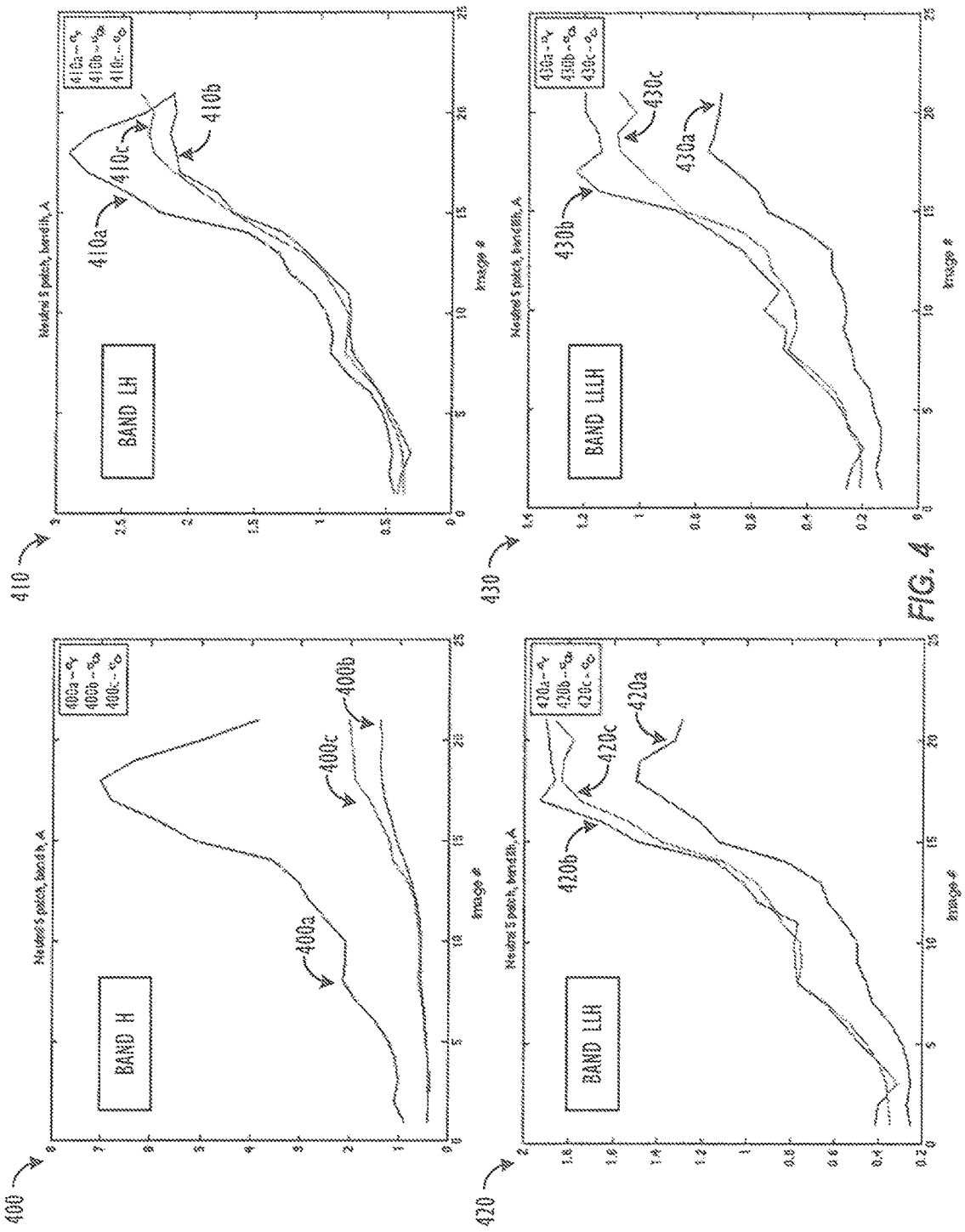
FIG. 4 is a group of graphs showing measured signal-to-noise levels for various frequency bands, according to one embodiment.

Turning now to FIG. 4, a group of graphs (400/410/420/430) showing measured signal-to-noise levels for various frequency bands are illustrated, according to one embodiment. More particularly, the exemplary graphs shown in FIG. 4 depict sub-band noise for neutral path 5 in the ColorChecker chart. Across the x-axis of the graphs is the "image #" field, representing a series of 21 images of neutral patch 5 under an indoor 'A' illuminant, taken at increasing gain levels, from left to right. As will be understood, similar information may be captured for each of the color patches on the ColorChecker chart and incorporated into the noise model. The y-axes of the graphs represent noise in the particular sub-band being plotted. As may now be understood with reference to the exemplary multi-band decomposition filter chain block diagram described in FIG. 3, graph 400 corresponds to band H (i.e., the highest frequency bands), graph 410 corresponds to band LH, graph 420 corresponds to band LLH, and graph 430 corresponds to band LLLH (i.e., the lowest frequency bands). In each graph, the 'a' line represents noise in the luma channel, $\sigma_Y$; the 'b' line represents noise in the blue-difference chroma channel, $\sigma_{Cb}$; and the 'c' line represents noise in the red-difference chroma channel, $\sigma_{Cr}$.

As may now be more fully appreciated, noise typically increases with gain until gain maxes out (around image #17), and then, as the image becomes darker, it decreases. Further, in low frequency sub-bands (e.g., band LLH and band LLLH), chroma noise dominates luma noise. These insights and others described herein were used to help construct the multi-band YCbCr noise model based on scene metadata that will now be described in greater detail.

A Multi-Band YCbCr Noise Model Based on Scene Metadata

Prior art approaches performing noise estimation on RGB image data rather than YCbCr data cannot exploit Human Visual System (HVS) properties that correspond to specifically to luma/chroma space. For example, the HVS is more sensitive to changes in brightness than it is changes in color, and it is less sensitive to high-frequency noise than it is to low-frequency noise. Further, such prior art approaches either make restrictive assumptions that are not reasonable—or that are too complex to run on consumer-level camera devices in real-time. Examples of restrictive assumptions include assumptions regarding noise variance propagation from RAW and assumptions regarding gamma's continuity. For example, rather than implement gamma as a continuous non-linear function, often times it is implemented as a piecewise-linear function, breaking down into several distinct, linear regions, e.g.: shadows, two midtones, and highlights. There are two main advantages to this approach: 1) linear functions are easier to implement; and 2) selective regions may be boosted or attenuated independently. However, one of the main disadvantages of this approach is that the resulting function is not continuous at the "transition points" between the distinct regions. Hence, noise propagation techniques that rely on first order derivatives will have a sharp spike at these non-continuous transition points.

Since the noise modeling functions used in prior art approaches are not based on an actual noise model, they don't adapt very well to changing light and brightness levels. Moreover, to the inventors' knowledge, a chroma noise model has not been addressed by the prior art approaches. Finally, none of these prior art approaches effectively utilize camera metadata, e.g., analog and digital camera gains, signal-to-noise ratios, lux levels, special modes (binning on/off), white balance gains, etc., if the formation of a noise mode. Thus, it would be desirable to have a multi-band, YCbCr noise model based on scene metadata that effectively characterizes band-wise, signal-wise, and channel-wise YCbCr dependencies.

The inventors' process of deriving a YCbCr noise model for a particular camera involved taking images of a standard, 24-patch ColorChecker Color Rendition Chart under several illuminants for varying light levels using a studio light. The RGB images were then converted to YCbCr. Then, a simple low-pass filter was used to split the Y, Cb, and Cr channels into sub-bands. At every band-split, the image was sub-sampled by two in each dimension. The number of sub-bands needed to fully characterize the noise model for a given implementation may depend on sensor characteristics. In some embodiments, four sub-bands may be used. Next, the color patches were extracted from each image, and the mean and standard deviation of each patch were computed in each band for each of the Y, Cb, and Cr channels. The mean serves as the signal value, while the standard deviation serves the corresponding noise amount within in each band. Additionally, camera parameters were captured for each shot, such as: analog gain, digital gain, lux level, signal-to-noise ratio, white balancing gains, color correction matrix, binning mode on/off, etc.

Once a set of signal-to-noise tables has been acquired for different camera parameters, the dependence of noise on camera parameters can be studied so as to isolate important metadata. Finally, an analytical model may be fit to the data that relates noise amount to input signal and various camera parameters.

According to one embodiment of the derived multi-band YCbCr noise model, the full-band noise is not considered to be "white" (i.e., independent of frequency), but the sub-band noise is approximated to be white within each individual sub-band. The number of bands used in any particular model depends on how many bands are required to approximate the noise as band-wise white. According to one embodiment, an affine linear model is used for modeling noise in the luma channel, wherein the noise model depends on signal, analog and digital camera gains, a non-linear scaling function for luma that scales the full-band noise to each sub-band, and a system-wide gamma for luma. The non-linear scaling function may comprise a band number- and gain-dependent non-linear function that is used to relate full-band noise to sub-band noise. The advantage of using such a function is that it provides a single expression for the noise model that may be used to predict noise for each of the sub-bands. If such a function is not used, then a different expression may be required for each sub-band. According to another embodiment, a chroma noise model is based on camera gains, white balance gains, a non-linear scaling function for chroma that scales the full-band noise to each sub-band, and a system-wide gamma for chroma.

Thus, according to one embodiment, the inventors have determined a luma noise model as follows:

First, a bandScale value may be computed according to the following equation that is both gain- and band-dependent, and which may be used for non-linear scaling of the data:

bandScale=2^(1−band)/power(gain,2^(1−band)/bandFactorY);

where band is the band number (e.g., 1, 2, 3, 4), gain is the product of AGC (i.e., analog gain), ispDGain (i.e., the ISP's digital gain), and sensorDGain (i.e., the image sensor's digital gain).

Next, a maximum noise level, maxSigma, may be defined as follows:

maxSigma=power(gain,gammaY)*bandScale;

Next, a bias value for the linear model may be defined as follows:

bias=maxSigma/biasFactor;

(where biasFactor is the minimum noise standard deviation, i.e., at signal level 0).
The slope of the linear modeling function (assuming, in this case, a linear model is being used) is then defined as follows:

```
if gain <= 8 (i.e., the max analog gain)
    slope = maxSigma/slopeFactor;
else
    slope = maxSigma/(2*slopeFactor); (where slopeFactor is the rate at
which noise standard deviation increases with signal).
```

Finally, the luma noise value is calculated using a simple "y=ax+b"-style linear equation model, as follows:

ySigma=min((bias+signal*slope),maxSigma).

According to another embodiment, the inventors have determined a chroma noise model as follows:
First, a bandScale value may be computed according to the following equation that is band-dependent, and which may be used for non-linear scaling of the data:

bandScale=power(bandFactorC,−band/1.9)*power(band,2.0);

where bandFactorC is a value estimated from the data that scales noise between each band in the respective chroma channel.
The chroma noise values may then be calculated using the following power equations:

cbSigma=power(AWBBGain*gain,gammaC)*bandScale;

crSigma=power(AWBRGain*gain,gammaC)*bandScale;

where AWBBGain and AWBRGain are the blue-channel and red-channel white balance gains, respectively, and gammaC is the overall gamma of the respective chroma channel. The gamma is described as an "overall" gamma here because several factors may contribute to level dependence, e.g., base gamma and local tone mapping.

According to other embodiments, additional metadata may be incorporated into the model, such as signal-to-noise ratio, lux levels, special modes (e.g., binning on/off), etc. According to still other embodiments, it may be desirable to have a model that provides more accurate fit to the measured signal and noise data (i.e., the data gathered from the images of the ColorChecker Color Rendition Chart) within each band than a linear model, e.g., a polynomial model, such as a quadratic or cubic model. Yet another embodiment may involve devising a noise model for the camera pipeline before gamma is applied and using "unscented transformation" (UT) to accurately predict noise after gamma is applied. Unscented transformation has been developed for control systems to predict noise mean and standard deviations after non-linear operations. As mentioned above, noise propagation methods often rely on first order derivatives to predict noise levels after gamma is applied. However, even if the gamma function is continuous, this method may not work very well in low light conditions. In such situations, predicting noise mean and standard deviations via unscented transform is quite robust.

YCbCr Multi-Band Noise Reduction

Nearly all noise reduction algorithms use some sort of 'similarity score' to determine if the pixels neighboring the pixel that is being denoised are close enough in value to be included in the denoising calculation. According to some embodiments, the value of the pixel being denoised is simply replaced by the average of all 'similar' pixels in the neighborhood. However, there are many ways in which a particular implementation can define what a 'similar' pixel is. According to one embodiment, the following equation may be used to define a 'similar' pixel:

$|y_c - y_i| < X\sigma$, where $y_c$ is the value of the pixel being denoised, $y_i$ is the value of a particular pixel in the neighborhood of the pixel being denoised, X represents denoising strength (i.e., a tunable factor to control how much noise is included), and σ is the estimated noise level from the noise model, e.g., the noise model described above. Thus, two pixels are considered similar if the absolute difference between them is less than a tunable, gain-dependent denoising strength parameter (based, at least in part, on the amount of residual noise desired in the output image) times the estimated noise level for the pixel being denoised (as obtained from the noise model).

Most prior art noise models assume the same noise in Cb and Cr. However, in practice, this is often not actually the case. For example, Auto White Balance operations aren't unity, i.e., the same amount of gain is not applied to each of the red, green, and blue channels. To illustrate, if the scene illuminant for a particular image happens to be a reddish light (e.g., tungsten), then the gain of the blue channel will be much larger than the gain of the red channel. As a result, the noise in the Cb channel would then be relatively larger than the noise in the Cr channel, due to the bigger gain being applied in the Cb channel. If a particular noise reduction model assumes the noise to be equal in the Cb and Cr channels, the noise reduction won't work well. If the model is designed just for Cb, then it will not adjust for noise in Cr. Thus, the noise model may not be hand-tuned for a particular illuminant or channel, because then the behavior will suffer for another illuminant or channel. This behavior is the same for many pipeline operations, e.g., gain, white balance, demosaicing, color correction, gamma, etc. That is, the noise behavior changes in some way with each of these operations, so it's difficult to characterize the noise based on any one operation performed by the pipeline. Hence, it may be helpful to have both a luma and a chroma noise model for each camera.

Figure 5:
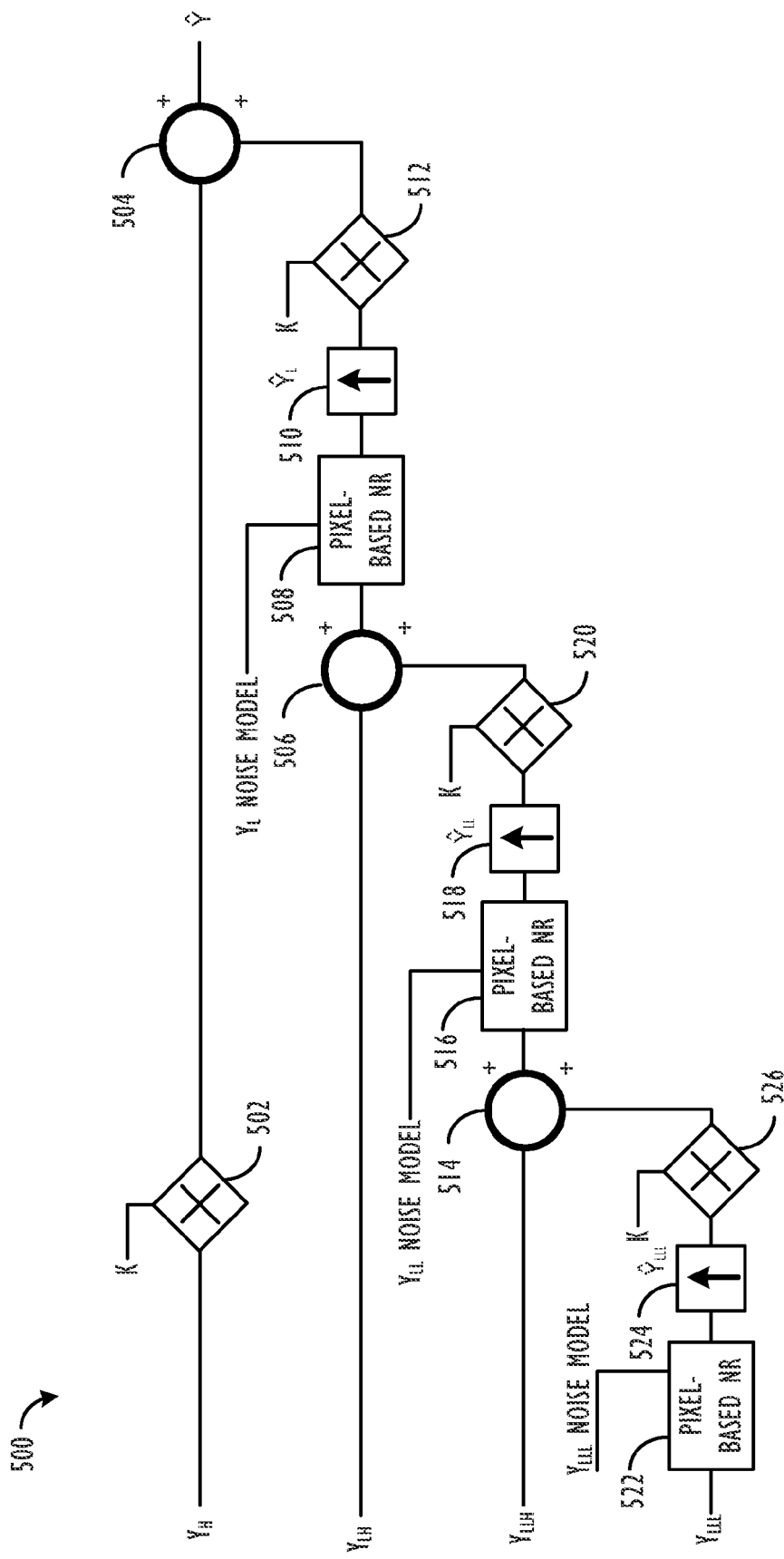
FIG. 5 is a block diagram of a multi-band denoising scheme, according to one embodiment.

Turning now to FIG. 5, a block diagram of a multi-band luma denoising scheme 500 is shown, according to one embodiment. (It is to be understood that the same scheme could also be applied to chroma data using the aforementioned chroma noise models.) Once the signal has been decomposed into individual sub-bands (e.g., in accordance with the filter chain described with reference to FIG. 3 above), the multi-band denoising scheme 500 may be applied to the image data. First, the $Y_H$ band may be passed through sharpening filter 502. Sharpening filter 502 may use a tuning parameter, k, in order to control the amount of sharpness/fine grain amplitude desired for a particular band. According to some embodiments, for bright scenes, there could be no attenuation of the sharpness filter, i.e., k=1. If more sharpness is desired, k could be greater than 1. For low light levels where pipeline artifacts become more visible, k may progressively become smaller, i.e., k<1.

Next, the lowest frequency band information, $Y_{LLL}$, may be passed through the $Y_{LLL}$ noise model 522 in order to perform pixel-based noise reduction. The noise reduced data may then be up-sampled by up-sampler 524. The label $\hat{Y}_{LLL}$ ("y-hat") in FIG. 5 represents the noise-reduced image information for the $Y_{LLL}$ band. Then, a sharpening filter 526 may also be used on the noise-reduced data. This information is then combined with the information from the next highest frequency sub-band, $Y_{LLH}$, via addition junction 514. Then, the process of noise reducing, upscaling, and optionally sharpening is repeated at each sub-band level before the resulting image information is combined with the information from the next higher frequency band, until the highest frequency band, $Y_H$ (which, according to some embodiments is not noise-reduced), is combined with, resulting in the reduced image luma plane, $\hat{Y}$. A similar process may be performed independently on each of the chroma channels, using the respective chroma noise models for each sub-band. As may now be understood, by sharpening the filtered sub-bands independently, the denoising scheme can enhance signal only—and not noise (as is the case with sharpening masks that operate on unfiltered image data).

As described above, according to some embodiments, noise reduction is only performed on the low- to mid-frequency bands. The highest frequency band is added back to the denoised frequency bands in order to get the final result. In this manner, the objectionable low-to-mid frequency noise is removed while the high frequency noise, i.e., "blue noise," is retained to convey a sharp impression—as well as mask certain pipeline artifacts. According to some embodiments, the cutoff point for frequencies above which noise reduction is not to be performed could be "adaptive." For low light conditions, where there is less high frequency information, the cut-off frequency of the highest frequency band is lowered to retain more noise, due to the fact that artifacts are relatively large, and it is desirable to mask them and leave a textured appearance. For bright light conditions, the cut-off frequency of the highest frequency band is raised to retain only the very high frequency, pleasing "blue-noise", due to the fact that the artifacts are smaller, and therefore not as important to be masked.

The noise models described herein may be further improved using channel correlation. For example, if two chroma pixels are adjudged to be 'similar' to one another according to the 'similarity score' measure being used by the denoising algorithm, the algorithm may also attempt to determine how similar the luma values for the pixels are, confirming the 'similarity' determination of the algorithm based on chroma comparison only if the luma values of the pixels are also within an acceptable similarity threshold. In this way, color edges within the image are less likely to degrade or "leak" across independent features in the image.

Adaptive Multi-Band Denoising Based on Local Noise Modeling

The center of a captured image is where the camera's lens has the ability to capture the most signal. As pixels get farther and farther away from the center of the image, the lens response progressively decreases. At the corner of the image, the signal could be as low as half of the signal in the center. Thus, in order to achieve same brightness across the image, the pixels on the sides and corners of the image may be gained by the corresponding "lens shading factors," but this also increases noise in the corner areas of the images.

To boost dynamic range, a process known as "local tone mapping" (i.e., LTM) boosts shadowy areas in the image to a greater extent than high-light regions of the image, thus further amplifying noise in those regions. This can result in objectionable "crunchy" noise in the image. Typically, local tone mapping does not change much between individual adjacent pixels. Instead, it changes at a "regional" level within the image—allowing the LTM curves for the image to be represented by a fairly coarse LTM map When multiple images are fused, in order to avoid "ghosting" artifacts, regions with moving objects, camera shake, rolling shutter, etc. in them may be excluded from the fusion process, making the fusion strength spatially-dependent, which, in turn, makes noise spatially-dependent. In other words, the "no motion" areas in the image may use pixels from all the frames, while regions that have motion or registration errors may not use all the frames, thus resulting in a spatially-varying noise characteristic.

What is needed is an accurate and simple way to incorporate lens shading gains, LTM, and fusion strength into a denoising algorithm, so that it locally adapts to changing noise levels in the image. Thus, according to one embodiment, the inventors have developed a locally-adaptive multi-band noise model that uses all the gains in the system, including spatially-varying gains (e.g., lens shading, LTM, and fusion strength) as well as spatially-constant gains (e.g., analog and digital gains) to estimate an overall image gain level. This "overall gain" value may then be used by the noise model to estimate pixel noise.

Gain and noise levels have a highly non-linear relationship. Therefore, if spatial gains are simply used naively to drive denoising strengths, it will result in less denoising in low light and more denoising in bright light. By deriving an overall gain—and using the noise model to predict noise—a much more accurate noise estimate may be obtained.

In addition to spatially-dependent denoising/fusion, some embodiments will also perform intensity-dependent fusion. This can serve to further mitigate the "crunchy" look in shadow areas that results from local tone mapping. By relaxing the fusion constraint in low intensity regions, more denoising may be performed in the shadowy regions of the image, where there is less detail but more noise.

In bright regions of the image, the demosaicing block in the image processing pipeline can cause aliasing in high contrast regions. To mitigate this, some embodiments may use intensity-dependent de-moiré strength within the denoising algorithm. That is, such embodiments may increase chroma denoising strength in bright regions, leading to less visible aliasing artifacts.

Figure 6:
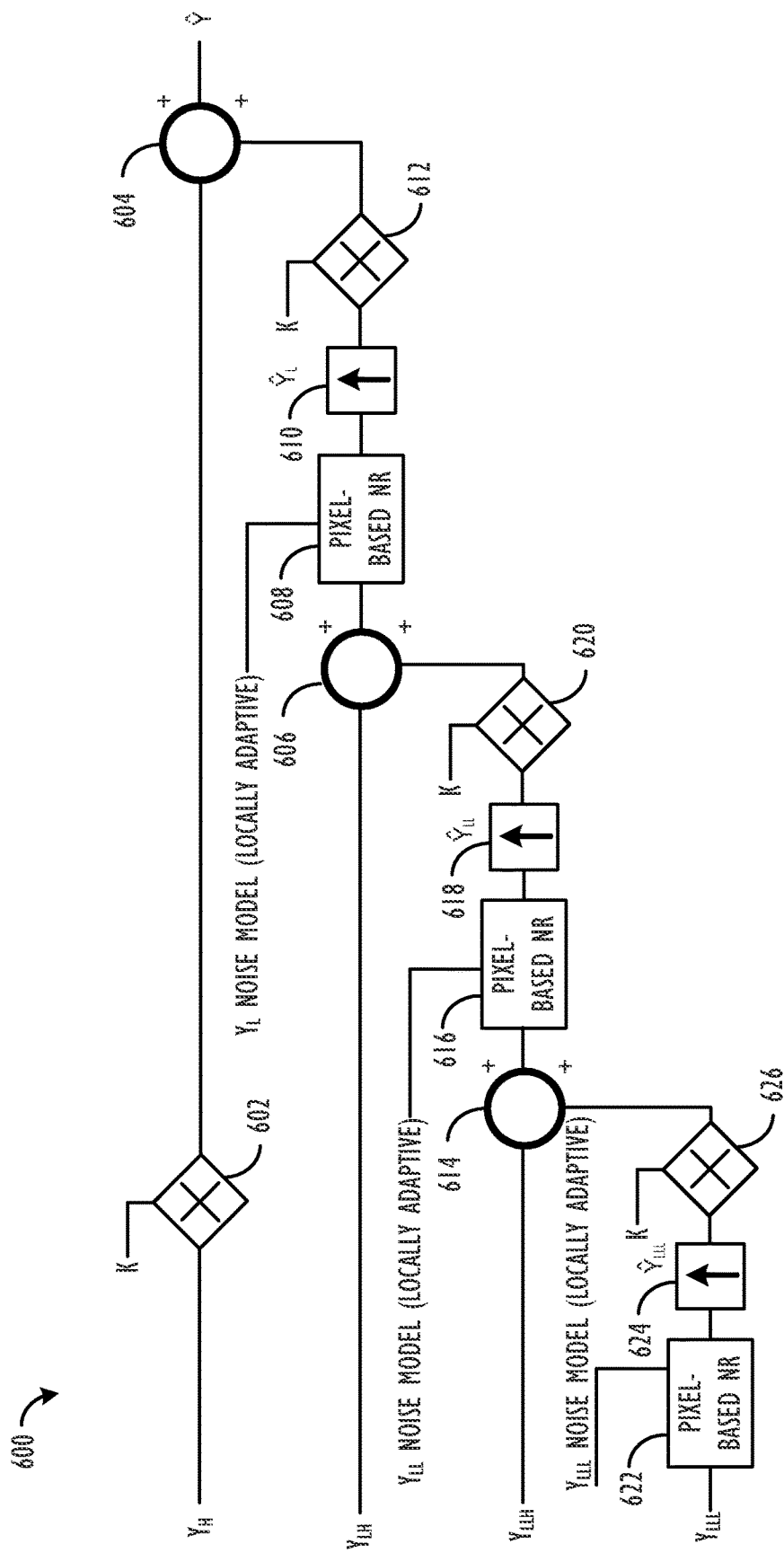
FIG. 6 is a block diagram of a multi-band locally-adaptive denoising scheme, according to one embodiment.

Turning now to FIG. 6, a block diagram of a multi-band locally-adaptive denoising scheme 600 is shown, according to one embodiment. Multi-band locally-adaptive denoising scheme 600 is similar to the multi-band denoising scheme 500 shown and described with reference to FIG. 5. A primary difference is that, for each sub-band, the pixel-based noise reduction (608/616/622) is done using a locally-adaptive noise model for the respective sub-band. The locally-adaptive noise models may take local noise into account using one or more of the local noise modeling techniques described above.

By splitting the luma and/or chroma signals into sub-bands and applying locally-adaptive noise reduction to all the bands below a given frequency and applying adaptive attenuation or amplification based on light levels to the bands above the given frequency, and then summing the bands to provide the full bandwidth signals, image enhancement is achieved. The YCbCr multi-band approach to denoising is able to operate independently—and in an optimized fashion—on both luma and chroma channels. Noise reduction is done based on models developed for both luma and chroma channels by measurements taken for multiple frequency bands, in multiple patches on the ColorChecker chart, and at multiple gain levels in order to develop a simple—yet robust—set of models that may be tuned offline a single time for each camera and then applied to images taken by such cameras in real-time without excessive processing requirements and with satisfactory results across illuminant types and lighting conditions.

Figure 7:
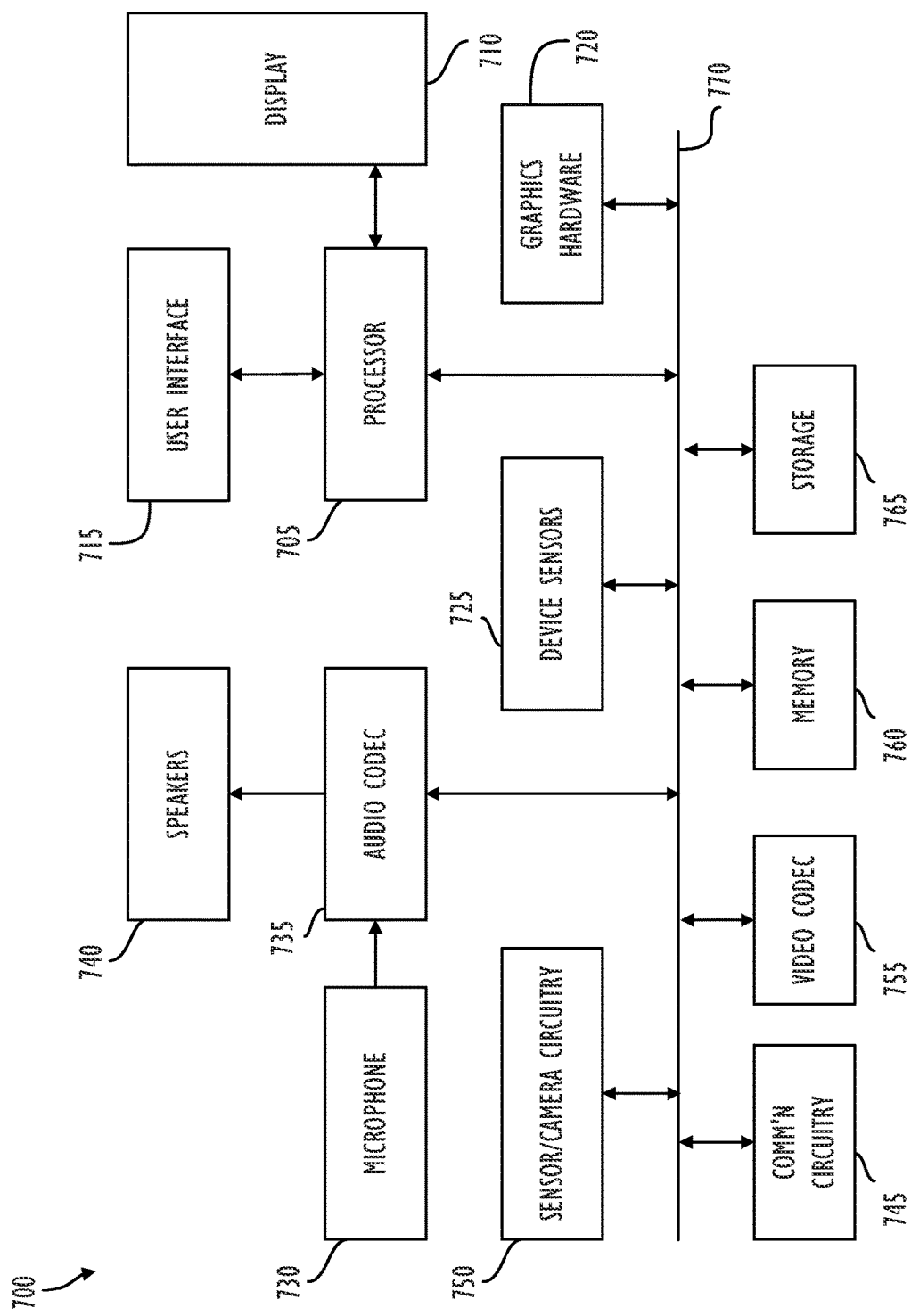
FIG. 7 is a block diagram of an exemplary image processing device, according to one embodiment.

Referring now to FIG. 7, a simplified functional block diagram of an illustrative electronic device 700 is shown according to one embodiment. Electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, digital image capture unit 750, video codec(s) 755, memory 760, storage 765, and communications bus 770. Electronic device 700 may be, for example, a personal digital assistant (PDA), personal music player, mobile telephone, digital camera, or a notebook, laptop, or tablet computer system.

Processor 705 may be any suitable programmable control device capable of executing instructions necessary to carry out or control the operation of the many functions performed by device 700 (e.g., such as the denoising operations accordance with operations in any one or more of the Figures). Processor 705 may, for instance, drive display 710 and receive user input from user interface 715 which can take a variety of forms, such as a button, keypad, dial, a click wheel, keyboard, display screen and/or a touch screen. Processor 705 may be a system-on-chip such as those found in mobile devices and include a dedicated graphics processing unit (GPU). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 process graphics information. In one embodiment, graphics hardware 720 may include one or more programmable graphics processing units (GPUs).

Sensor and camera circuitry 750 may capture still and video images that may be processed to generate images, at least in part, by video codec(s) 755 and/or processor 705 and/or graphics hardware 720, and/or a dedicated image processing unit incorporated within circuitry 750. Images so captured may be stored in memory 760 and/or storage 765. Memory 760 may include one or more different types of media used by processor 705, graphics hardware 720, and image capture circuitry 750 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to retain computer program instructions or code organized into one or more modules and written in any desired computer programming language. When executed by, for example, processor 705, such computer program code may implement one or more of the methods described herein.

It should be emphasized that the previously described embodiments of the present invention, particularly any preferred embodiments, are merely possible examples of implementations, set forth for a clear understanding of the principles of the invention. Many variations and modifications may be made to the previously described embodiments of the invention without departing substantially from the spirit and principles of the invention. All such modifications and variations are intended to be included herein within the scope of this disclosure and the present invention and protected by the following claims.

We claim:

1. A non-transitory program storage device comprising instructions stored thereon to cause one or more processors to:

receive signals from an imager;

process the signals received from the imager, wherein the processed signals comprise at least one luma signal and at least one chroma signal;

separate at least one of the processed luma signals into a plurality of bands;

separate at least one of the processed chroma signals into a plurality of bands;

apply noise reduction to all bands of the at least one processed luma signal below a first frequency, wherein a first luma noise model is used to estimate a noise level of each pixel of the at least one processed luma signal;

apply noise reduction to all bands of the at least one processed chroma signal below a second frequency, wherein a first chroma noise model is used to estimate a noise level of each pixel of the at least one processed luma signal;

sharpen all bands of the at least one processed luma signal below the first frequency;

sharpen all bands of the at least one processed chroma signal below the second frequency; and sum all of the bands of the at least one processed luma signal and the at least one processed chroma signal to produce an enhanced image signal.

2. The non-transitory program storage device of claim 1, wherein the instructions to apply noise reduction to all bands of the at least one processed luma signal further comprise instructions to evaluate one or more similarity thresholds for at least one pixel in the at least one processed luma signal based, at least in part, on one or more of the following: a band number of the respective pixel, an imager gain level when the signals were captured, and a gain-dependent desired denoising strength.

3. The non-transitory program storage device of claim 1, wherein the instructions to apply noise reduction to all bands of the at least one processed chroma signal further comprise instructions to evaluate one or more similarity thresholds for at least one pixel in the at least one processed chroma signal based, at least in part, on one or more of the following: a band number of the respective pixel, an imager gain level when the signals were captured, and a gain-dependent desired denoising strength.

4. The non-transitory program storage device of claim 1, wherein the instructions to sharpen all bands of the at least one processed luma signal below the first frequency further comprise instructions to sharpen all bands of the at least one processed luma signal below the first frequency independently of one another.

5. The non-transitory program storage device of claim 1, wherein one of the luma noise model and the chroma noise model comprises a linear model or polynomial function model.

6. The non-transitory program storage device of claim 1, wherein one of the first frequency and the second frequency are tunable based, at least in part, on a brightness level of the received signals.

7. The non-transitory program storage device of claim 1, wherein the instructions to sharpen all bands of the at least one processed chroma signal below the second frequency further comprise instructions to sharpen all bands of the at least one processed chroma signal below the second frequency based, at least in part, on the imager gain level when the signals were captured.

8. The non-transitory program storage device of claim 1, wherein the first luma noise model and the first chroma noise model each depends on one or more of the following: signal value, analog and digital imager gains, white balance gains, a non-linear scaling function that scales full-band noise to each band, and a system-wide gamma estimate.

9. A computer-implemented method for image enhancement comprising:
receiving signals from an imager;
processing the signals received from the imager, wherein the processed signals comprise at least one luma signal and at least one chroma signal;
separating at least one of the processed luma signals into a plurality of bands;
separate at least one of the processed chroma signals into a plurality of bands;
applying noise reduction to all bands of the at least one processed luma signal below a first frequency, wherein a first luma noise model is used to estimate a noise level of each pixel of the at least one processed luma signal;
applying noise reduction to all bands of the at least one processed chroma signal below a second frequency, wherein a first chroma noise model is used to estimate a noise level of each pixel of the at least one processed luma signal;
sharpening all bands of the at least one processed luma signal below the first frequency;
sharpening all bands of the at least one processed chroma signal below the second frequency; and
summing all of the bands of the at least one processed luma signal and the at least one processed chroma signal to produce an enhanced image signal.

10. The computer-implemented method of claim 9, wherein the act of applying noise reduction to all bands of the at least one processed luma signal further comprises evaluating one or more similarity thresholds for at least one pixel in the at least one processed luma signal based, at least in part, on one or more of the following: a band number of the respective pixel, an imager gain level when the signals were captured, and a gain-dependent desired denoising strength.

11. The computer-implemented method of claim 9, wherein the act of applying noise reduction to all bands of the at least one processed chroma signal further comprises evaluating one or more similarity thresholds for at least one pixel in the at least one processed chroma signal based, at least in part, on one or more of the following: a band number of the respective pixel, an imager gain level when the signals were captured, and a gain-dependent desired denoising strength.

12. The computer-implemented method of claim 9, wherein the act of sharpening all bands of the at least one processed luma signal below the first frequency further comprises sharpening all bands of the at least one processed luma signal below the first frequency independently of one another.

13. The computer-implemented method of claim 9, wherein one of the luma noise model and the chroma noise model comprises a linear model or polynomial function model.

14. The computer-implemented method of claim 9, wherein one of the first frequency and the second frequency are tunable based, at least in part, on a brightness level of the received signals.

15. The computer-implemented method of claim 9, wherein the act of sharpening all bands of the at least one processed chroma signal below the second frequency further comprises sharpening all bands of the at least one processed chroma signal below the second frequency based, at least in part, on the imager gain level when the signals were captured.

16. The computer-implemented method of claim 9, wherein the first luma noise model and the first chroma noise model each depends on one or more of the following: signal value, analog and digital imager gains, white balance gains, a non-linear scaling function that scales full-band noise to each band, and a system-wide gamma estimate.

17. A system, comprising:
an imager having a gain level;
a memory having, stored therein, computer program code; and
one or more processing units operatively coupled to the memory and configured to execute instructions in the computer program code that cause the one or more processing units to:
receive signals from the imager;
process the signals received from the imager, wherein the processed signals comprise at least one luma signal and at least one chroma signal;
separate at least one of the processed luma signals into a plurality of bands;
separate at least one of the processed chroma signals into a plurality of bands;
apply noise reduction to all bands of the at least one processed luma signal below a first frequency, wherein a first luma noise model is used to estimate a noise level of each pixel of the at least one processed luma signal;
apply noise reduction to all bands of the at least one processed chroma signal below a second frequency, wherein a first chroma noise model is used to estimate a noise level of each pixel of the at least one processed luma signal;
sharpen all bands of the at least one processed luma signal below the first frequency;
sharpen all bands of the at least one processed chroma signal below the second frequency; and
sum all of the bands of the at least one processed luma signal and the at least one processed chroma signal to produce an enhanced image signal.

18. The system of claim 17, wherein the instructions to apply noise reduction to all bands of the at least one processed luma signal further comprise instructions to evaluate one or more similarity thresholds for at least one pixel in the at least one processed luma signal based, at least in part, on one or more of the following: a band number of the respective pixel, an imager gain level when the signals were captured, and a gain-dependent desired denoising strength.

19. The system of claim 17, wherein the instructions to apply noise reduction to all bands of the at least one processed chroma signal further comprise instructions to evaluate one or more similarity thresholds for at least one pixel in the at least one processed chroma signal based, at least in part, on one or more of the following: a band number of the respective pixel, an imager gain level when the signals were captured, and a gain-dependent desired denoising strength.

20. The system of claim 17, wherein the first luma noise model and the first chroma noise models each depends on one or more of the following: signal value, analog and digital imager gains, white balance gains, a non-linear scaling function that scales full-band noise to each band, and a system-wide gamma estimate.

\* \* \* \* \*

UNITED STATES PATENT AND TRADEMARK OFFICE
CERTIFICATE OF CORRECTION

PATENT NO. : 9,525,804 B2
APPLICATION NO. : 14/474100
DATED : December 20, 2016
INVENTOR(S) : Farhan A. Baqai et al.

It is certified that error appears in the above-identified patent and that said Letters Patent is hereby corrected as shown below:

In the Claims

Column 12, Line 31: Replace the phrase "luma signal" with the phrase --chroma signal--;

Column 13, Line 26: Replace the word "separate" with the word --separating--;

Column 13, Line 36: Replace the phrase "luma signal" with the phrase --chroma signal--;

Column 14, Line 47: Replace the phrase "luma signal" with the phrase --chroma signal--.

Signed and Sealed this
Eighteenth Day of April, 2017

Michelle K. Lee
*Director of the United States Patent and Trademark Office*